United States Patent [19]

Mahon et al.

[11] Patent Number: 4,730,101

[45] Date of Patent: Mar. 8, 1988

[54] APPARATUS AND METHOD FOR CONTROLLING THE TEMPERATURE OF A FURNACE

[75] Inventors: Kenneth Mahon, Columbus; Gary S. Sheffield, Westerville; Gary L. Snider, Columbus; Milan Vukovich, Jr., Galena, all of Ohio

[73] Assignee: Edward Orton, Jr. Ceramic Foundation, Westerville, Ohio

[21] Appl. No.: 854,487

[22] Filed: Apr. 22, 1986

[51] Int. Cl.$^4$ .............................................. H05B 1/02
[52] U.S. Cl. ................................... 219/508; 219/497; 219/485; 340/589; 432/51; 374/25; 374/102
[58] Field of Search ............... 219/494, 497, 511, 508, 219/509, 485, 499, 501; 340/588, 589; 432/51; 374/102, 104, 25

[56] References Cited

U.S. PATENT DOCUMENTS

| | | | |
|---|---|---|---|
| 4,109,134 | 8/1978 | Van Herten | 219/501 |
| 4,277,671 | 7/1981 | Mori et al. | 219/501 |
| 4,367,399 | 1/1983 | Anthony et al. | 219/497 |
| 4,451,726 | 5/1984 | Anthony et al. | 219/413 |
| 4,461,616 | 7/1984 | Vukovich | 432/118 |
| 4,476,373 | 10/1984 | D'Antonio | 219/497 |
| 4,506,143 | 3/1985 | Telis et al. | 219/497 |
| 4,570,054 | 2/1986 | Chidzey et al. | 219/497 |
| 4,614,860 | 9/1986 | Kativois | 340/589 |
| 4,620,083 | 10/1986 | Andre | 340/589 |

OTHER PUBLICATIONS

Ziegler, J. G. and Nichols, N. B., "Optimum Settings for Automatic Controllers", *Transactions of the American Society of Mechanical Engineers*, Nov. 1942.
Ziegler, J. G. and Nichols, N. B., "Process Lags in Automatic-Control Circuits", *Transactions of the American Society of Mechanical Engineers*, Jul. 1943.

*Primary Examiner*—M. H. Paschall
*Attorney, Agent, or Firm*—Banner, Birch, McKie & Beckett

[57] ABSTRACT

A microcomputer control system for a furnace is disclosed which provides accurate control of the temperature of the furnace such that the temperature can be quickly increased to a predetermined desired temperature without overshooting the desired temperature. The control system determines the tuning constants of the furnace as a function of the system's response to a predetermined input and, thereafter, uses the determined tuning constants to accurately control the temperature of the furnace. The control system employs a novel method for increasing the temperature of a furnace wherein full power is applied to the furnace heat source until the microcomputer makes the determination, based upon the furnace tuning constants, that power supplied to the furnace must be reduced to prevent the temperature of the furnace from overshooting the desired temperature. Upon making such a determination, the microcomputer controls the temperature of the furnace such that the furnace temperature exponentially achieves the desired temperature. The control system further includes apparatus adapted to cooperate with the microcomputer for preventing damage to the furnace and materials heated therein from malfunction of either the control system apparatus or the microcomputer software.

15 Claims, 6 Drawing Figures

APPARATUS AND METHOD FOR CONTROLLING THE TEMPERATURE OF A FURNACE

MICROFICHE APPENDIX

A detailed flow chart of the operation of the invention is included as a microfiche appendix to this application. One page having 45 frames set forth in the appendix.

BACKGROUND OF THE INVENTION

This invention generally relates to the control of temperature in furnaces or kilns for the heat treatment of metals or the firing of ceramics.

Most controllers that are used with furnaces are described as single loop controllers and are of PID type (three mode controllers). PID type controllers get their name from the Proportional, Integral, and Derivative actions that are employed to produce the control action.

The Proportional Action (sensitivity) supplied by the controller is an output or action that is determined from the instantaneous difference (deviation) between the current measured temperature and the desired temperature. The output action is normally limited to the range between zero and 100% and represents a fraction of the rated energy input to the furnace's heating element(s). Most proportional action controllers also operate with an adjustable gain which may be called proportional band control.

Integral Action, also called reset action, is an output or action based on the time integral of the deviation (difference between the desired temperature and the current measured temperature). This too, is usually adjustable and is frequently inhibited during certain occurrences.

Derivative Action, also called rate action, is an output that is proportional to the rate of change of the measured temperature. This action is also adjustable.

The major problem with the use of a three mode controller is that the quality of the results is dependent upon the user's experience or training with control systems in general. Further, the quality of the results is dependent upon the user's experience with the specific furnace, temperature probe and controller being used. Repeated heating tests over a prolonged period may be required to establish control settings and obtain the degree of control required for the application.

This results in costly expenditures for energy and manpower to get the system in operation. Or often times with less experienced or less knowledgeable operators, it results in poor furnace control and some loss in quality of product receiving the heat treatment.

J. G. Zigler and N. B. Nichols in "Optimum Settings for Automatic Controllers," November 1942 *Transactions of the A.S.M.E.*, and in "Process Lags in Automatic-Control Circuits", July 1943 *Transactions of the A.S.M.E.*, teach that the process reaction curve can be determined graphically by supplying a known input and then letting the process measuring device plot the resultant curve. From the curve, one can calculate the system's reaction rate (R) and lag (L). (See FIG. 8, p. 763, Nov. 42.) Although Zigler's and Nichols' graphical methods were demonstrated to work, they are not widely taught or used in thermal process control.

Once the system is tuned and is placed in operation, frequent monitoring of the results may be necessary to see if the system is heating or controlling. Failure of control system components can result in costly over-heating or wasted time in getting the system back into operation. Failure to closely monitor the system will also lead the operator to believe the system is doing what has been set or programmed. Thus, the need to retune or change control settings may be overlooked until subsequent tests of the product indicate poor results were achieved.

Therefore, it is desirable to provide a method for accurately controlling the temperature of a furnace. It is also desirable to provide a method for quickly increasing the temperature of a furnace to a final temperature without oscillation or overshoot. It is further desirable to provide control apparatus for performing the above described functions. It is lastly desirable to provide the control apparatus with fail-safe features for terminating operation of the furnace and notifying the user in case of control system malfunction.

SUMMARY OF THE INVENTION

It is, accordingly, an object of the present invention to provide a method for accurately controlling the temperature of a furnace.

It is a further object of the present invention to provide a method for quickly increasing the temperature of a furnace to a final desired temperature without oscillation or overshoot.

It is a still further object of the present invention to provide control apparatus for accurately controlling the temperature of a furnace.

It is another object of the present invention to provide control apparatus for accurately controlling the temperature of a furnace which apparatus is adapted with fail-safe features for terminating the operation of the furnace and notifying the user in case of control system malfunction.

In accordance with the method which is the subject of the present invention for controlling the temperature of a furnace, the furnace tuning constants are first determined and, thereafter, these tuning constants are used to modulate the quantum of power supplied to the furnace to thereby control the temperature of the furnace. To determine the tuning constants of the furnace, the furnace is supplied with a constant predetermined quantam of energy and monitored to determine the maximum rate at which the temperature of the furnace increases in response to this predetermined quantam of energy. The tuning constants are then determined from the observed maximum rate of temperature change.

Further, in accordance with the invention, a method for quickly increasing the temperature of a furnace to a desired temperature without overshoot comprises the step of appying full power to the furnace until the determination is made, based on the furnace tuning constants, that power to the furnace must be reduced in order to prevent the furnace temperature from overshooting the desired temperature. After making this determination, power is controllably supplied to the furnace such that the temperature of the furance attains the desired temperature in an exponential manner.

Apparatus for implementing the method which is the subject of the present invention includes apparatus for protecting the furnace from microprocessor or other control malfunctions. Particularly, the protection apparatus includes a temperature sensor for providing a temperature signal indicative of the furnace temperature. A heat source is also provided which is responsive to a heat control signal for heating the furnace. A data processor is included for providing the heat control signal. The data processor is responsive to the temperature signal to determine the tuning constants of the furnace. Further, the data processor is adapted to modulate the heat control signal in response to the determined tuning constants to thereby control the temperature of the furnace.

To provide protection of the furnace and materials heated therein, the apparatus of the present invention includes a second switch coupled to the power source and responsive to an override signal for transferring power received from the power source to a first switch. The first switch is responsive to the heat control signal for transferring power received from the second switch to a heating element. Also, a power checker is provided for determining when the heating element is receiving power from the power source. The data processor is responsive to the power checker for determining whether the first switch has malfunctioned and, if so, interrupting the override signal to prevent the second switch from providing power received from the power source to the first switch.

BRIEF DESCRIPTION OF THE DRAWINGS

These and other objects of the invention will become apparent from a reading of the following detailed description of the drawings in which.

DETAILED DESCRIPTION OF THE PREFERRED EMBODIMENT

As mentioned hereinabove, the present invention provides method and apparatus for accurately controlling the temperature of a furnace during all phases of operation, i.e., heating the furnace to a desired temperature and/or maintaining the furnace temperature at a desired level. As such, the present invention comprises an improvement over the apparatus and method disclosed and claimed in U.S. Pat. No. 4,461,616 to Milan Vukovich, Jr., the disclosure of which is incorporated herein, in its entirety, by the foregoing reference thereto.

Figure 1:
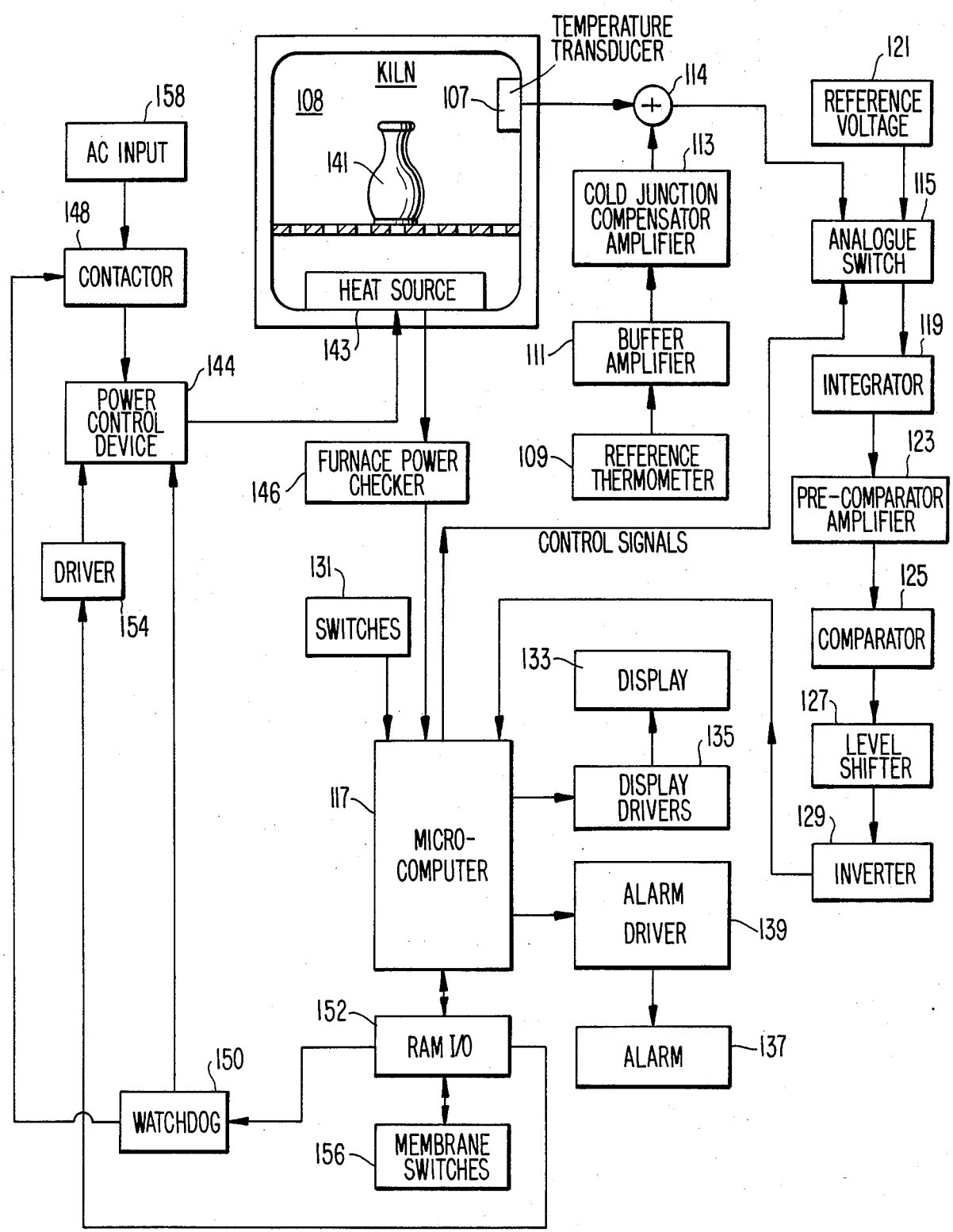
FIG. 1 is an illustrative block diagram of the control apparatus which comprises the present invention.

With reference to FIG. 1, there is provided an illustrative block diagram of apparatus which comprises the subject invention. A heating furnace 108 or kiln for curing ceramic articles such as vase 141 includes a source of heat 413 coupled to receive power from power control device 144. Heat source 143 may comprise any apparatus for providing heat in response to the appropriate power received from power control device 144. As an example, heat source 143 may comprise a gas burner including an automatic ignition system for lighting the gas burner in response to electrical control signals and natural or other gas received from power control device 144. In the presently preferred embodiment, heat source 143 may comprise an electrical heating element responsive to electrical power received from power control device 144 for supplying heat to furnace 108.

Heat source 143 is also coupled to a furnace power checker 146. Furnace power checker 146 is provided for determining whether or not heat source 143 is receiving power from power control device 144. Furnace power checker 146 may comprise any apparatus for performing this function. In the present embodiment, furnace power checker 146 comprises means responsive to electrical power supplied to heat source 143 for providing a signal indicative of whether heat source 143 is receiving power from power control device 144. However, it will be apparent to those skilled in the art that many arrangements may be employed for determining whether heat source 143 is receiving the appropriate power from power control device 144. As an example, when heat source 143 comprises a gas or other combustible fuel burner which receives input gas fuel as well as an input control signal, furnace power checker 146 may be responsive to the input control signal for providing its signal indicative of whether heat source 143 is receiving power from power control device 144. Alternatively, furnace power checker 146 may comprise a pressure sensitive valve or other means located intermediate to power control device 144 and heat source 143.

Furnace power checker 146 is coupled to microcomputer 117. Microcomputer 117 is provided for controlling the operation of furnace 108 by supplying a heat control signal to power control device 144. (A detailed description of the method by which microcomputer 117 provides the heat control signal will be provided hereinbelow by reference to FIGS. 2–6.) Microcomputer 117 is further responsive to the output of furnace power checker 146 for determining whether power control device 144 is operating properly. Malfunction is determined by noting either:

(1) heat source 143 is not receiving power at times when the heat control signal is active, or (2) heat source 143 is receiving power at times when the heat control signal is not active. Microcomputer 117 is further adapted to provide an override control signal at times when a malfunction has been observed. The override control signal is provided to contacter 148 via watchdog circuit 150 and RAM input/output 152.

Contacter 148 comprises a switch coupled to receive the power from A.C. input device 158 and responsive to a control signal received from watchdog circuit 150 for providing the power received to power control device 144. Watchdog circuit 150 comprises circuitry for monitoring the override signal received from microcomputer 117 and for providing the appropriate control signals to contacter 148 and power control device 144 in absence of the override control signal. RAM input/output 152 comprises RAM circuitry and input/output devices for interfacing microcomputer 117 to watchdog circuit 150 as is known in the art.

In operation, microcomputer 117 is adapted to provide a constant output signal, which output signal is driven by a timed interrupt to the program which microcomputer 117 is adapted to implement. Upon determining that a malfunction has occurred, as described above, microcomputer 117 ceases to provide the override control signal such that watchdog circuit 150 controls contacter 148 to stop supplying power to power control device 144. In this manner, furnace 108 is protected from malfunctions to power control device 144, which malfunctions could result in damage to vase 141, furnace 108 and/or heat source 143. Further, by supplying the override control signal in response to a timed interrupt to the program of microcomputer 117, malfunctions in the program execution of microcomputer 117 will result in a failure to provide the override control signal such that watchdog circuit 150 will control contacter 148 and power control device 144 to cease supplying power to heat source 143. Hence, the furnace is also protected from overheating due to malfunctions in the program operation of microcomputer 117.

The remaining elements of FIG. 1, i.e., temperature transducer 107, reference thermometer 109, buffer amplifier 111, cold junction compensator amplifer 113, summing junction 114, analog switch 115, integrater 119, reference voltage 121, precomparator amplifier 123, comparator 125, level shifter 127, inverter 129, display 133, display drivers 135, alarm driver 139 and alarm 137 are each shown and described in the aforementioned U.S. Pat. No. 4,461,616. Therefore, these elements will not be described in detail herein. Generally, these elements are provided for providing a signal to microcomputer 117 which is indicative of the temperature of furnace 108. Further, these elements are provided for interfacing the control circuitry of FIG. 1 with a user of the furnace.

Other elements shown in FIG. 1, i.e., switches 131, driver 154, membrane switches 156 and AC input 158, are elements commonly known in the art. Switches 131 and 156 are provided for interfacing the initial programmer and users with microcomputer 117. Driver 154 is provided for amplifying the heat control signal supplied from microcomputer 117 for use by power control device 144. AC input 158 may comprise any means for supplying electrical power to heat source 143. As mentioned above, where heat source 143 comprises heating means other than an electrical heating element, AC input 158 would comprise the appropriate power source. Microcomputer 117 may comprise any suitable data processing device equipped with the appropriate peripheral circuitry, as is known in the art.

By properly programming microcomputer 117, the apparatus of FIG. 1 may be employed to accurately control the temperature of furnace 108. Generally, microcomputer 117 is adapted to determine the heating constants (also referred to herein as "tuning constants") of furnace 108 and to use the determined heating constants to modulate the heat control signal and thereby control the quantum of power supplied to the furnace such that the temperature of the furnace can be controlled accordingly. The tuning constants are determined by supplying a predetermined quantum of power to the furnace and monitoring the rate at which the temperature of the furnace changes. By determining the maximum rate at which the temperature of the furnace increases, and noting the time necessary to reach this rate and the temperature at which this rate is reached, a lag value for the furnace can be determined.

As used herein, lag refers to a characteristic of a particular furnace which is determined by observing the furnace response to a predetermined input. Lag can be thought of as a heat lag characteristic, particularly, the difference between the time required for the particular furnace to reach the temperature at which the maximum heating rate is observed and the time necessary for a linearly heating furnace, having a heating rate equal to the observed maximum rate, to reach this same temperature. The lag and the maximum heating rate are used to provide the tuning constants, i.e., a proportional tuning constant, an integral tuning constant and a derivative tuning constant.

To control the temperature of the furnace, microcomputer 117 measures the deviation between the desired furnace temperature and the present furnace temperature. This deviation is then combined with the foregoing tuning constants to provide proportional, integral and derivative control constants, which control constants are then used to modulate the heat control signal such that the appropriate proportion of power is supplied to heat source 143 from power control device 144.

Figure 2:
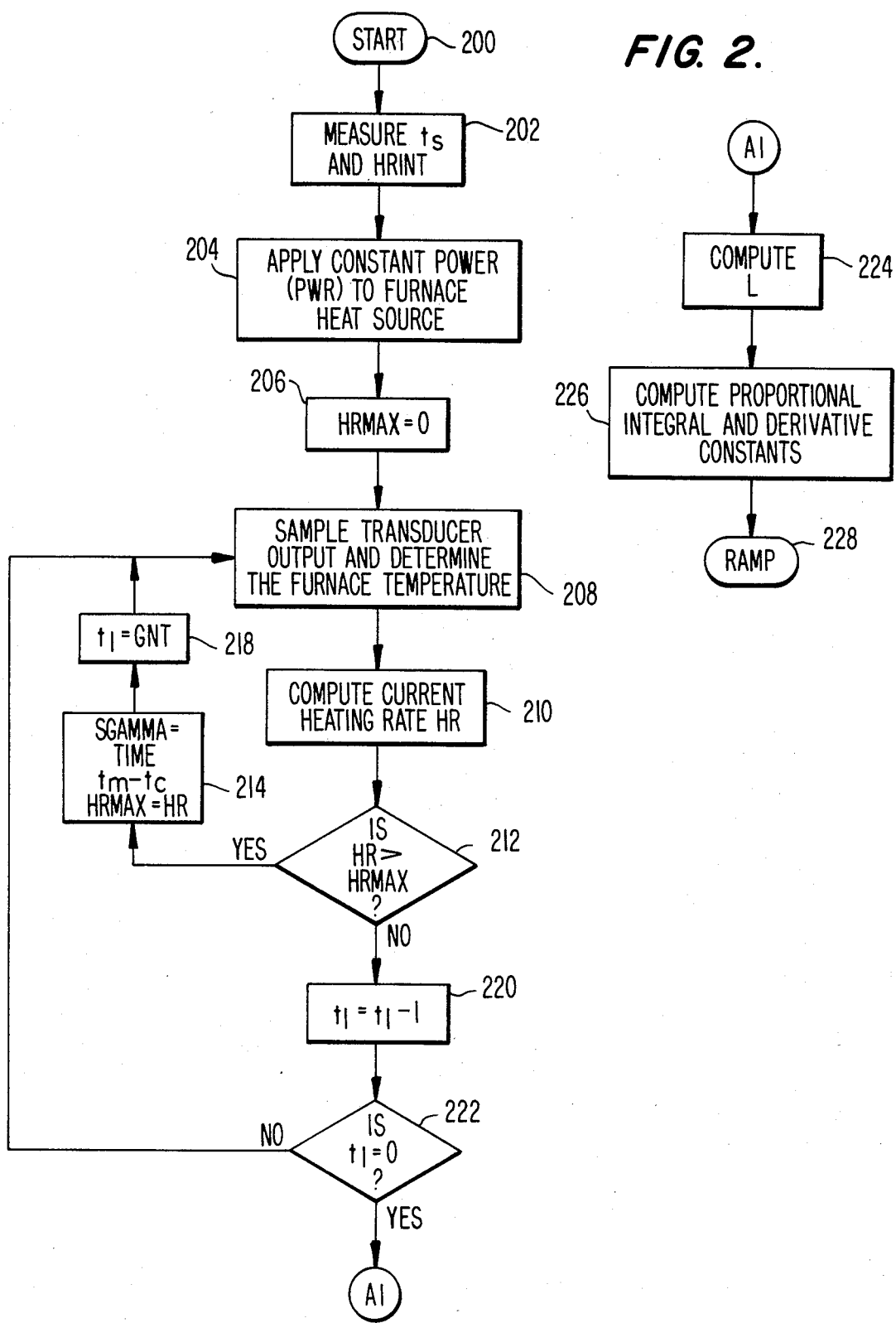
FIG. 2 is a decisional flow diagram of the method by which the apparatus of FIG. 1 determines the tuning constants of a furnace.

A more detailed description of the method by which microcomputer 117 controls the temperature of furnace 108 may be provided by reference to FIGS. 2-6. With reference to FIG. 2, there is provided a decisional flow diagram illustrating the method by which microcomputer 117 determines the maximum heating rate and the lag of the furnace. The method is began in step 200 wherein the user of furnace 108 presses the start button indicating that furnace 108 is to attain and sustain a desired temperature for a predetermined time interval. Microcomputer 117 measures the starting temperature $t_s$ via temperature transducer 107. Microcomputer 117 also determines the initial heating rate HRINT of furnace 108 by sampling a plurality of furnace temperatures over a known time interval, step 202. Thereafter, microcomputer 117 applies a constant predetermined quantum of power to heat source 143 of furnace 108, step 204. The percentage of power then being supplied to heat source 143 is determined and is recorded as the variable PWR for use later in determining the proportional tuning constants. In step 206, the variable HRMAX is initialized at zero. HRMAX is a variable used to record the maximum heating rate of the furnace observed while the furnace is being supplied with the predetermined quantum of power PWR.

After supplying the predetermined quantum of power to heat source 143, microcomputer 117 continuously samples temperature transducer 107 to determine the furnace temperature, step 208. From these temperature readings, microcomputer 117 computes the current heating rate and stores this in the variable HR, step 210. Thereafter, HR is compared with HRMAX to determine whether the current heating rate is greater than the presently recorded maximum heating rate, step 212, and, if so, stores the current heating rate as the maximum heating rate, step 214. Also in step 214, the time elapsed since the constant predetermined quantum of power has been supplied to heat source 143 is stored as SGAMMA and the current temperature $t_c$ is stored as $t_m$ which represents the temperature at which the current maximum heating rate has been observed. Thereafter, microcomputer 117 stores a predetermined constant CNT in a counting variable $t_1$, step 218, and returns to step 208. Microcomputer 117 will continue to compute the current temperature and the current heating rate and compare this heating rate to the previously measured maximum heating rate to determine which is greater. When the current heating rate is greater than the maximum heating rate, microcomputer 117 stores the current heating rate as the maximum heating rate and continues to compute more current heating rates. When the current heating rate is not greater than the maximum heating rate, then microcomputer 117 proceeds to step 220.

In step 220, counting variable $t_1$ is decremented by one. Thereafter, counting variable $t_1$ is compared with zero to determine whether zero is greater than the counting variable, step 222, and, if so, microcomputer 117 determines that the value of HRMAX is the maximum heating rate observed while applying the constant predetermined quantum of power to heat source 143. Alternatively, if counting variable $t_1$ is equal to zero, then microcomputer 117 will return to step 208 to again compute another heating rate and compare this heating rate with the value of HRMAX.

It will be appreciated by those skilled in the art that the combination of steps 218, 220 and 222 is to ensure that a plurality of measurements are taken wherein the current heating rate is not greater than that heating rate stored in the variable HRMAX, thus ensuring that minor variations in the heating rate, which variations could be caused by any number of reasons, do not cause an erroneous maximum to be found. In this regard, it is noted that the value of the variable CNT determines how many measurements must be taken before the control system can be assured that microcomputer 117 has found the maximum heating rate. In the preferred embodiment, the variable CNT is chosen to equal 16 such that 16 heating rates must be computed which are less than the value of the current maximum heating rate before the current maximum is determined to be the maximum heating rate for furnace 108 while being supplied with the constant predetermined quantum of power PWR.

After the maximum heating rate HRMAX has been found, microcomputer 117 proceeds to step 224 to compute the lag L of the furnace. As mentioned hereinabove, the lag of the furnace is defined as the difference between the time required for the furnace to reach the temperature at which the maximum heating rate is observed and the time necessary for a linearly heating furnace, having a heating rate equal to the observed maximum rate, to reach this same temperature. Accordingly, the lag L of furnace 108 is computed as follows:

$$L = [(SGAMMA*HRMAX) - (t_m - t_s)]/HRMAX.$$

Microcomputer 117 also computes the proportional, integral and derivative tuning constants for the furnace, PC, IC and DC, respectively, step 226 as follows:

$$PC = (a*PWR)/[(HRMAX - HRINT)*L],$$

$$IC = b/(L*60),$$

and $$DC = b*L*60.$$

It will be appreciated by those skilled in the art that the variables a and b are amplification constants for varying the response of the control circuit. Generally, these variables are chosen to be constants falling within the range of:

$$1.0 \leq a \leq 2,$$

and $$0.5 \leq b \leq 1.0.$$

In the preferred embodiment, variables a and b are selected to equal 1.4 and 0.72, respectively.

After determining the lag, maximum heating rate and tuning constants of the furnace, microcomputer 117 can then use these constants to accurately control the temperature of the furnace. Generally, microcomputer 117 will be required to heat the furnace to a predetermined temperature and maintain the furnace at this temperature for a predetermined time interval. As mentioned hereinabove, it is desirable that such a heating action can be performed as quickly as possible, without oscillation and without overshooting the desired temperature. Further, it is desirable to eliminate any variation in the actual temperature of the furnace from the desired temperature of the furnace while maintaining the temperature at the predetermined value for the predetermined time interval. To this end, after computing the lag, maximum heating rate and tuning constants of the furnace, microcomputer 117 then proceeds to a ramp function, step 228, which ramp function is provided to increase the temperature of the furnace to the desired level as quickly as possible with no oscillation and/or overshoot.

Generally, heating of the furnace may be accomplished in one of two ways. That is, maximum power may be supplied to the furnace until a point where it approaches the predetermined temperature and, at that point, microcomputer 117 will modulate the power supplied to heat source 143 such that the temperature of furnace 108 approaches the desired temperature without overshoot. Alternatively, the temperature of furnace 108 may be increased linearly in accordance with a predetermined rate until the desired temperature is approached and, at that point, microcomputer 117 will modulate the heat control signal such that power supplied to heat source 143 is accordingly modulated and the temperature of furnace 108 approaches and holds the desired temperature without variation. Both of these methods will be discussed by reference to the decisional flow diagram of FIG. 3.

Figure 3:
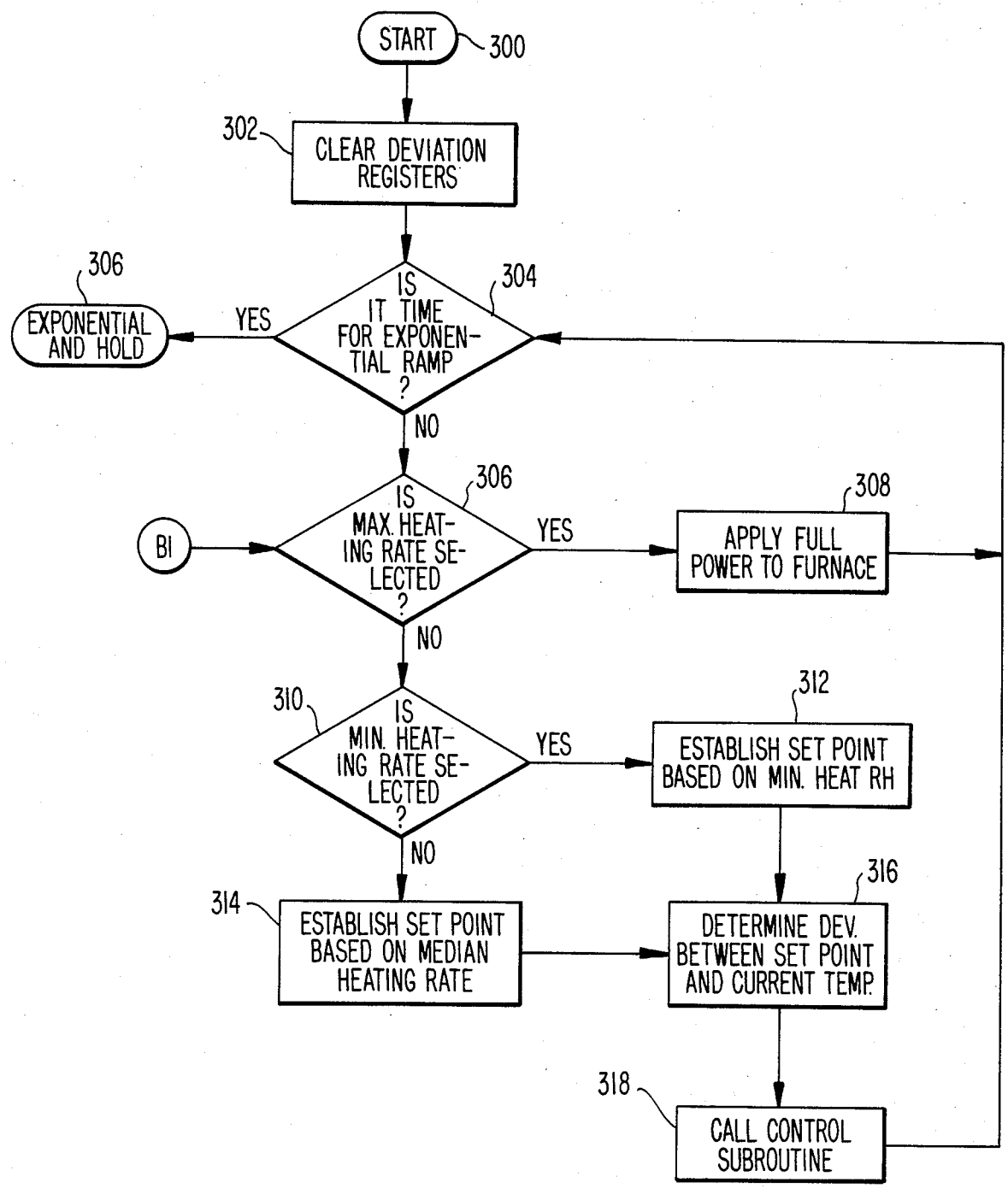
FIG. 3 is a decisional flow diagram of the method by which the apparatus of FIG. 1 increases the temperature of a furnace to a predetermined desired temperature.

With reference to FIG. 3, the ramp function is initiated in step 300 after microcomputer 117 determines the maximum heating rate, lag and tuning constants of the furnace as described hereinabove. Microcomputer 117 clears all deviation registers, step 300. The deviation registers are simply means for storing a plurality of deviation variables, as is known in the art. The deviation variables used herein comprise a current deviation between the goal or set point temperature and the current temperature referred to herein as DEV, a stored deviation value which represents the last DEV computed referred to herein as DEV', and an integral of the deviation from the point at which the ramp function of FIG. 3 is initiated until the furnace power is removed at the end of the operation cycle referred to herein as INT. The deviation registers are cleared simply by setting each value to zero.

After clearing the deviation registers, microcomputer 117 determines whether it is time for the exponential ramp function, step 304, and, if so, proceeds to the exponential and hold function, step 306, which function will be described more fully below by reference to FIG. 4. Briefly, the exponential and hold function is provided to exponentially reduce the heating rate of the furnace, using the determined tuning constants, such that the temperature of the furnace does not overshoot the desired temperature.

The determination of step 304 as to whether it is time to proceed to the exponential and hold function generally comprises a prediction, based on the tuning constants of furnace 108, as to whether the temperature of the furnace will increase beyond the desired temperature before the next opportunity for microcomputer 117 to effectively modulate the heat control signal. It will be noted by those skilled in the art that although the temperature of the furnace may not be predicted to exceed the desired temperature of the furnace before the next opportunity of microprocessor 117 to modulate the heat control signal, the decision of step 304 may, nonetheless, determine that in order for microcomputer 117 to effectively modulate the heat control signal, it is necessary that the exponential and hold function be instituted several cycles before the desired temperature would be exceeded. This is, of course, due to a heating inertia of furnace 108 which inertia is reflected in the tuning constants of the furnace. More particularly, to determine whether it is time to proceed to the exponential and hold function, microcomputer 117 determines whether the following expression is true:

$$t_c \geq t_d - L \cdot HR \cdot RH4,$$

wherein $t_c$ represents the current temperature, $t_d$ represents the desired temperature and RH4 represents a temperature variable which is, in the preferred embodiment, equal to $(500/t_d)$. If the above expression is true, then microcomputer 117 will proceed to the exponential and hold function of FIG. 4. If the above expression is not true, then microcomputer 117 will continue to ramp by proceeding to step 306.

In step 306, microcomputer 117 determines whether the maximum heating rate is selected, that is, whether maximum power is to be supplied to heat source 143 or whether a predetermined rate of increase has been selected. If the maximum heating rate has been selected, then microcomputer 117 will apply full power to the furnace, step 308, and return to step 304. Microcomputer 117 will continue this loop until it is determined that it is time to proceed to the exponential and hold function of FIG. 4. Alternatively, if the maximum heating rate has not been selected, then microcomputer 117 will proceed to step 310.

In step 310, microcomputer 117 determines whether the minimum heating rate has been selected. In the preferred embodiment, two linear heating rates can be selected, those being 3° C. per minute and 1° C. per minute. However, it will be appreciated by those skilled in the art that a variety of heating rates can be selected and, further, that the current method can be adapted such that the user can select any desired heating rate. If the minimum heating rate has been selected, then microcomputer 117 proceeds to step 312. Conversely, if the minimum heating rate has not been selected, then microcomputer 117 proceeds to step 314. In steps 312 and 314 a set point temperature is determined which temperature is based on the minimum and median heating rate, respectively. That is, when the median heating rate, 3° C. per minute in the preferred embodiment, has been selected then the set point temperature will be based on a heating rate of 3° C. per minute. That is, knowing the approximate time necessary for one cycle of the ramp routine, the desired heating rate and the current temperature, the set point temperature is chosen to represent the temperature at which furnace 108 should be the next time steps 312 and 314 are executed. After the set point temperature has been established, microcomputer 117 measures the deviation DEV between the set point temperature and the current temperature, step 316.

It will be apparent to those skilled in the art that the set point temperature represents an intermediate desired temperature when operating in the linear increase mode. Hence, the set point temperature is the appropriate temperature for calculating the deviation DEV between the current temperature and the desired temperature while operating in this mode. Also, as will be discussed by reference to FIG. 6, the exponential approach function also provides set point temperatures which represent intermediate desired temperatures during the exponential approach mode of operation. These set point temperatures are also appropriate for use in this calculation. At all other times, the final desired temperature is used for this calculation.

Figure 5:
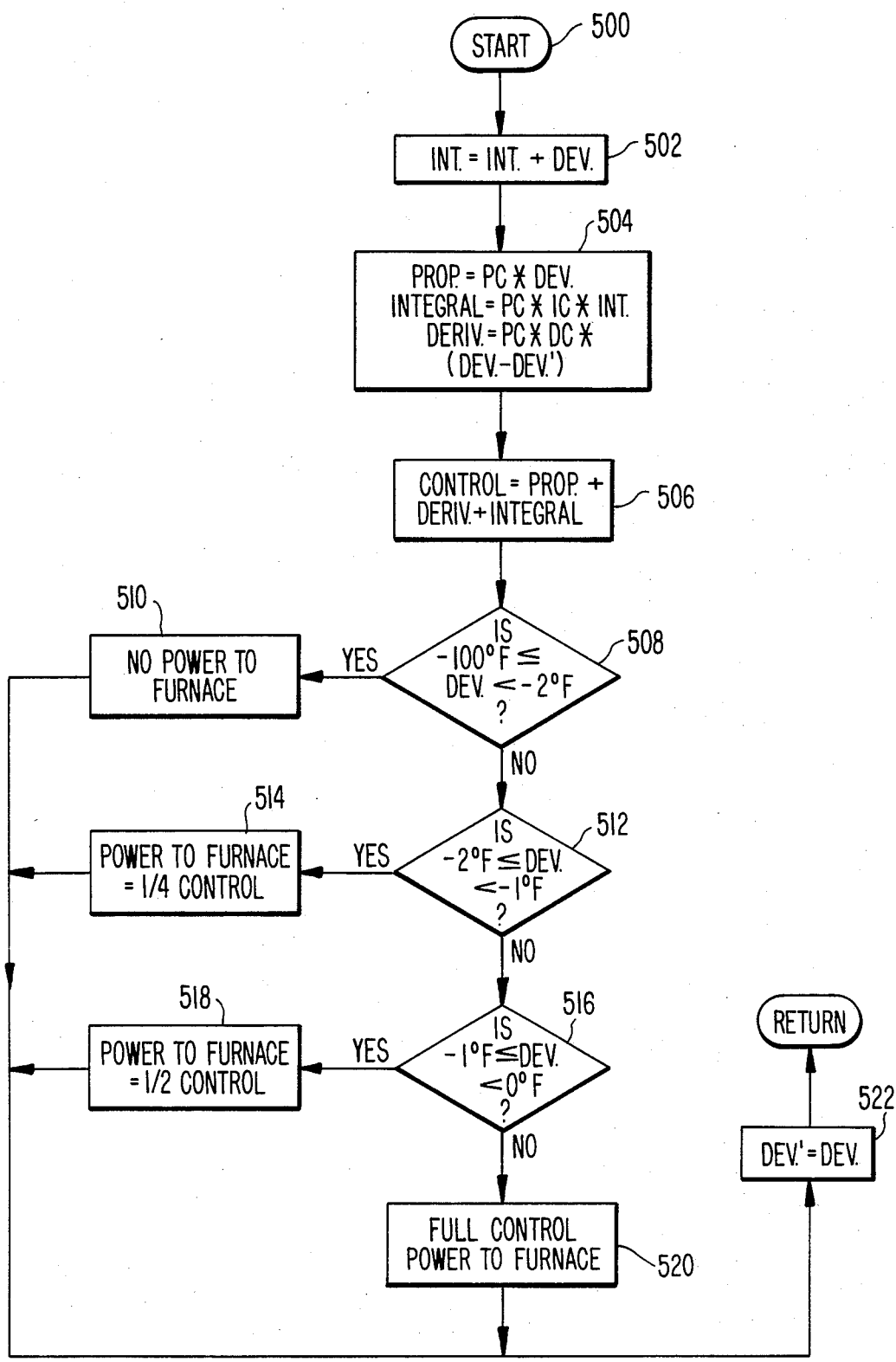
FIG. 5 is a decisional flow diagram of the method by which the apparatus of FIG. 1 modulates the heat control signal.
Figure 6:
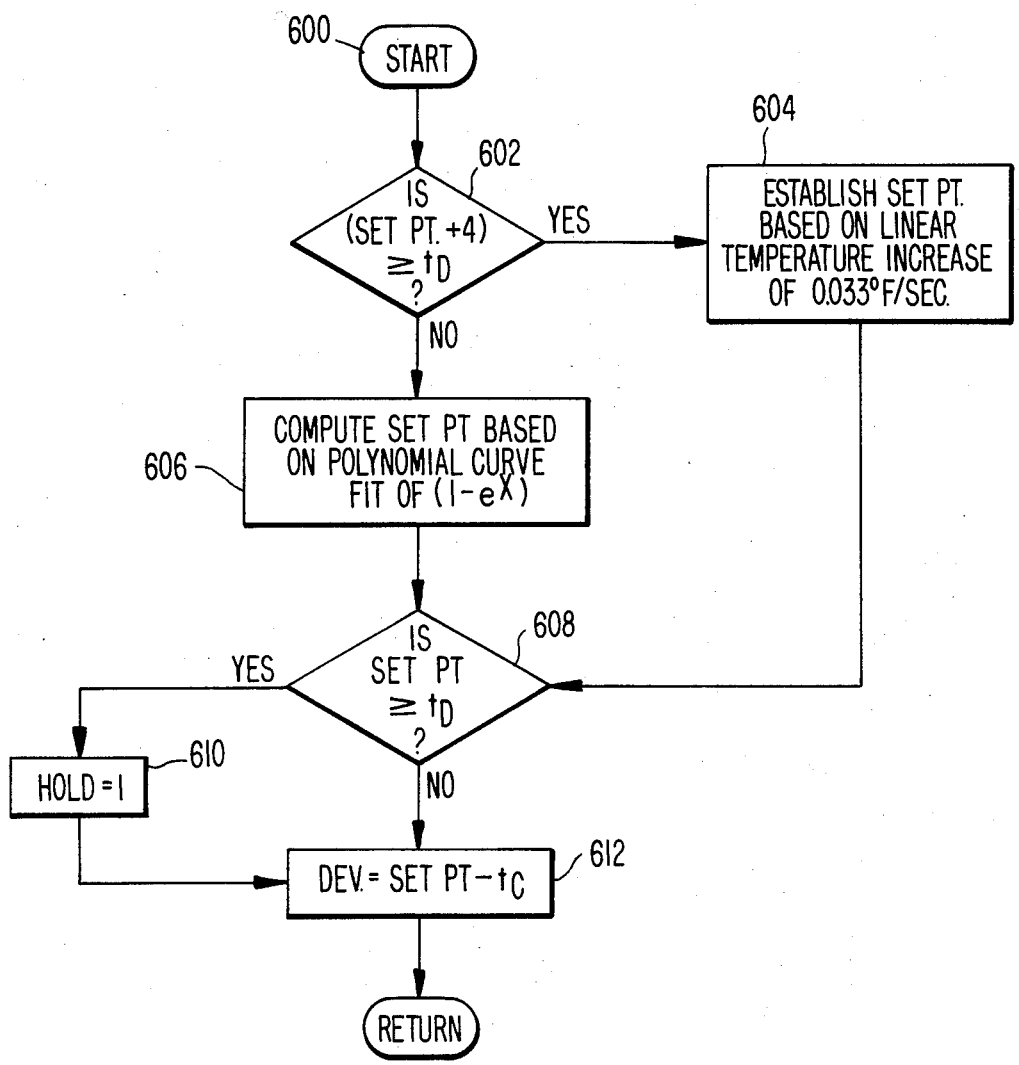
FIG. 6 is a decisional flow diagram illustrating the method by which the apparatus of FIG. 1 determines what temperatures need to be attained such that the furnace will exponentially approach the predetermind desired temperature.

After determining the temperature deviation DEV, microcomputer 117 calls the control subroutine described in the illustrative flow diagram of FIG. 5 such that the appropriate heat control signal can be applied to power control device 144. Accordingly, the power supplied to heat source 143 will be modulated such that the temperature of furnace 108 is appropriately controlled, step 318. Thereafter, microcomputer 117 returns to step 304 of the ramp function to again determine whether it is time to proceed to the exponential and hold function.

Figure 4:
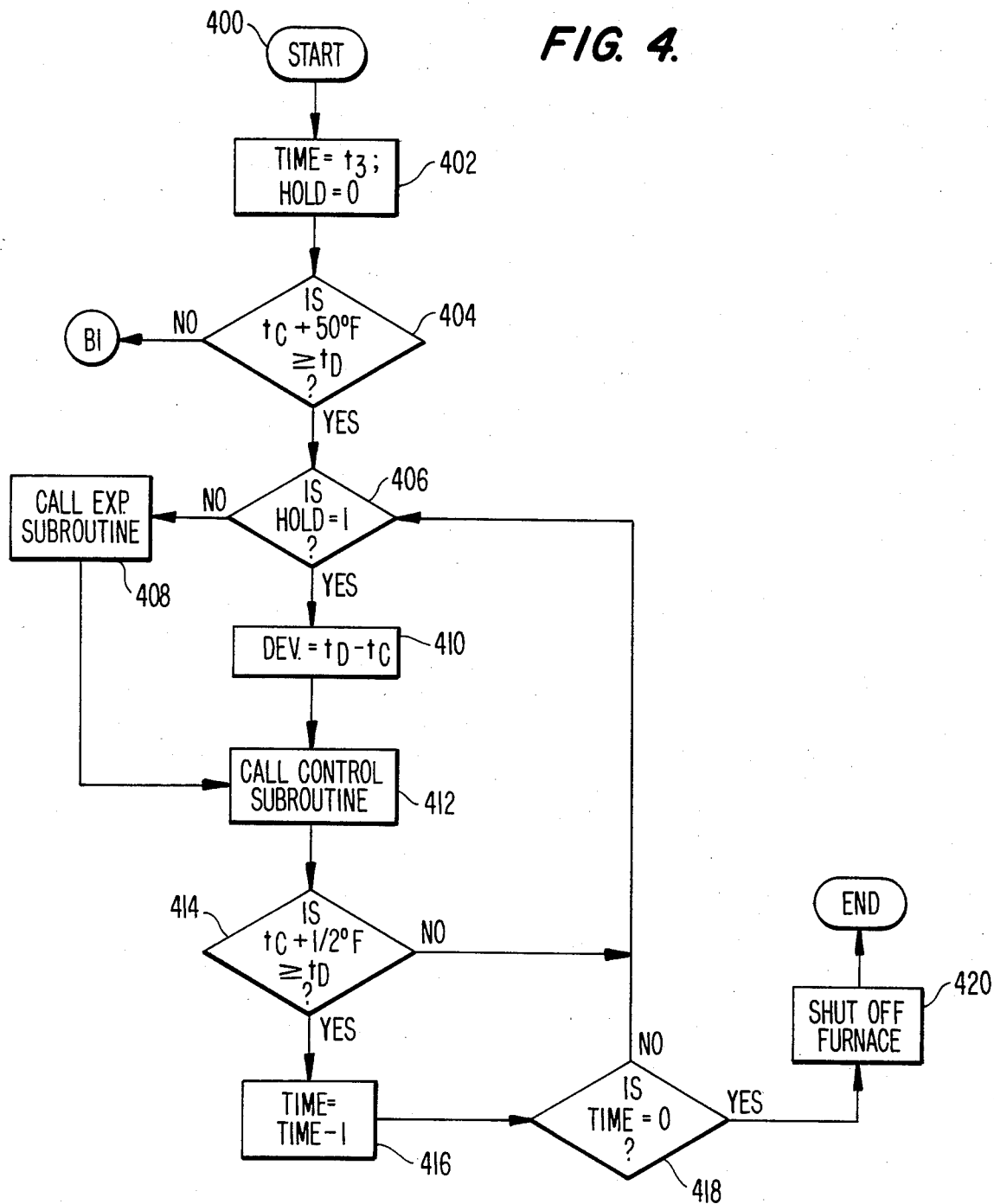
FIG. 4 is a decisional flow diagram illustrating the method by which the apparatus of FIG. 1 controls the temperature of the furnace so that it exponentially approaches a predetermined desired temperature and maintains this predetermined desired temperature for a predetermined period of time.

Hence, during the ramp function the temperature of furnace 108 is increased at either an uncontrolled full power rate or under a controlled rate until microcomputer 117 determines that it is time to proceed to the exponential and hold function of FIG. 4. With reference to FIG. 4, the exponential and hold function is initiated at step 400 and proceeds to step 402 wherein a time variable TIME is initiated to a predetermined value $t_3$ and wherein a hold variable HOLD is initiated at zero. After step 402, microcomputer 117 determines whether the temperature of the furnace is within 50° F. of the desired temperature, i.e., whether:

$$t_c + 50° F. \geq t_d.$$

If the foregoing expression is not true, then microcomputer 117 returns to step 306 to continue increasing the temperature of the furnace at the chosen rate. It will be appreciated by those skilled in the art that the decision of step 404 is somewhat redundant to the decision of step 304 described hereinabove with reference to FIG. 3. However, the decision of step 404 is included to ensure that the temperature of furnace 108 is within a prescribed minimum range before proceeding to the exponential approach and hold function. It has been experimentally determined that in cases where the temperature of the furnace is not within approximately 50° of the desired temperature, then an extraordinarily long period is required before attaining the desired temperature.

If the current temperature of the furnace is within 50° of the desired temperature, then microcomputer 117 determines whether the HOLD variable is equal to one, step 406. The HOLD variable is provided for determining whether the temperature is still approaching the desired temperature, i.e., whether the method of FIG. 4 is operating in the exponential approach mode, or whether the temperature of the furnace has attained the desired temperature, i.e., whether the method of FIG. 4 is operating in the hold mode. If the HOLD variable is not equal to one, then microcomputer 117 will call the exponential approach subroutine, step 408, which subroutine computes an exponential set point temperature and returns a temperature deviation value DEV based on the exponential set point temperature, as will be discussed in more detail by reference to FIG. 6. If the HOLD variable is equal to one and, therefore, the method of FIG. 4 is operating in the hold mode, then microcomputer 117 will determine the deviation value DEV based on the temperature difference betwen the final desired temperature $t_d$ and the current temperature $t_c$, step 410. After determining the deviation in accordance with step 410 or in accordance with the exponential routine of step 408, microprocessor 117 then proceeds to call the control subroutine of FIG. 5 to provide the appropriate modulation to the heat control signal, step 412. Thereafter, microcomputer 117 determines whether the current temperature $t_c$ is within $\frac{1}{2}$° of the desired temperature $t_d$, step 414, and, if not, returns to step 406. Alternatively, if the current temperature is within $\frac{1}{2}$° of the desired temperature, then microcomputer 117 will decrement the time variable TIME by one, step 416, and compare the time variable to zero, step 418, to determine whether the furnace has been at the desired temperature for the predetermined time interval $t_3$. If TIME is equal to zero, then microcomputer 117 will shut off the furnace, step 420, and end the routine. If, however, TIME is not equal to zero, that is if the furnace has not been at the desired temperature for the predetermined time interval, then microcomputer 117 will continue with step 406 holding the temperature of the furnace at the desired temperature.

Hence, the method of FIG. 4 is provided for exponentially increasing the temperature of the furnace to the desired temperature and holding the temperature of the furnace at the desired temperature for a predetermined time interval and, thereafter, shutting off the furnace. In performing this function, the method of FIG. 4 relies on an exponential subroutine to determine set point temperatures and deviations while the furnace is being exponentially heated to the desired temperature, which subroutine will be described in detail by reference to the decisional flow diagram of FIG. 6. Further, to modulate the heat control signal such that the appropriate power is supplied to heat source 143, microcomputer 117 relies on a control subroutine, which control subroutine will be described in detail herein by reference to the decisional flow diagram of FIG. 5.

The control subroutine comprises the method illustrated in FIG. 5, which method begins at step 500. Microcomputer 117 integrates the deviation variable by maintaining a continuous sum INT of the deviation values, step 502. Microcomputer 117 then computes the proportional, integral and derivative control values, PROP, INTEGRAL and DERIV, respectively, which values are proportional to the deviation variable as follows:

PROP=PC*DEV;

INTEGRAL=PC*IC*INT;

and

DERIV+PC*DC*(DEV−DEV'), step 504. A final control value is then computed which is equal to the sum of the proportional, integral and derivative control values as follows:

CONTROL=PROP+INTEGRAL+DERIV.

step 506. Thereafter, microcomputer 117 determines the amount of power to be supplied to furnace 108 as a result of the deviation between the present temperature and the set point or desired temperature, steps 508-518.

If the present temperature is greater than the set point or desired temperature, i.e., DEV is negative, then the control value which represents the amount of power to be provided to the furnace is further limited. As an example, if the present temperature is more than 2° F. above the set point or desired temperature, in which case the deviation variable would be between −2° F. and −100° F., then no power is supplied to the furnace regardless of the value of the control variable determined in step 506. If the present temperature is more than 1° above the set point temperature, but not more than 2° above the set point temperature, then the power which is supplied to the furnace would be one-quarter ($\frac{1}{4}$) of that as determined by the control variable, steps 512 and 514. Also, if the present temperature is greater that the set point temperature but no more than 1° above the set point temperature, then the power which is supplied to the furnace would be one-half ($\frac{1}{2}$) of that as determined by the control variable, steps 516 and 518. Of course, if the deviation value is equal to or less than the current temperature, i.e., DEV is positive, then the power to the furnace is equal to the full CONTROL amount as determined in step 506, step 520. After supplying the proper amount of power to the furnace, microcomputer 117 then records the present deviation DEV as the previously recorded deviation DEV', step 522, and returns to the main portion of the program from which it was accessed.

As mentioned above and in accordance with the present invention, the exponential set points are determined such that the temperature of the furnace will approach the desired temperature in an exponential manner. These set point temperatures are determined in the manner illustrated in FIG. 6, wherein the routine is initiated in step 600. Thereafter, microcomputer 117 proceeds to step 602 wherein microcomputer 117 determines whether the present set point temperature is within 4° of the desired temperature. If the set point is within 4° of the desired temperature, then the new set point is established on the basis of a linear temperature increase of 0.033° F. per second, step 604. If, alternatively, the present set point temperature is not within 4° of the desired temperature, then the set point temperature is computed based on a polynomial curve fit of (1e−x), step 606. After computing the set point in either steps 604 or 606, microcomputer 117 then determines whether the present set point temperature is greater than or equal to the desired temperature, step 608. If the present set point temperature is greater than or equal to the desired temperature, then microcomputer 117 redefines the HOLD variable as one such that upon executing the exponential and hold function as described in FIG. 4, microcomputer 117 will no longer call the exponential subroutine described in step 408 thereof.

Returning to FIG. 6, after redefining the HOLD variable, or in the case where the present point temperature is not greater than or equal to the desired temperature, then microcomputer 117 performs step 612 wherein the deviation variable is defined as the difference between the set point temperature and the current temperature. Thereafter, microcomputer 117 returns to the portion of the main program from which it was accessed.

Hence, method and apparatus for accurately controlling the temperature of a furnace has been described. While only several presently preferred embodiments of the subject method and apparatus have been described in detail herein, it will be apparent to those skilled in the art that many modifications and variations may be employed without departing from the true scope and spirit of this invention. Accordingly, the scope of the subject invention is defined only by the claims which follow.

We claim:

1. A method for controlling the temperature of a furnace comprising the steps of:
   (a) supplying a predetermined quantum of energy for heating the furnace;
   (b) monitoring the heating rate at which the temperature of the furnace changes and the temperature of the furnace at each monitored heating rate until a maximum heating rate is observed and recording the maximum heating rate was well as the temperature at which the maximum heating rate is observed;
   (c) determining the heating characteristics of the furnace including at least the heat lag defined as the difference between the time required for the furnace to reach the temperature at which the maximum heating rate is observed and the time necessary for a linearly heated furnace, having a heating rate equal to the observed maximum rate, to reach this same temperature from the observed rate of temperature change; and
   (d) modulating the quantum of energy supplied to the furnace in response to the determined heating characteristics to thereby control the temperature of the furnace.

2. The method as recited in claim 1 wherein the step of monitoring the rate of temperature change of the furnace comprises the substeps of:
   (f) determining the temperature of the furnace prior to applying a predetermined quantum of power; and
   (g) determining the maximum heating rate (HRMAX) of the furnace while being supplied with the predetermined amount of power and, thereafter, recording the time (SGAMMA) elapsed since the predetermined amount power has been applied and recording the temperature of the furnace at which the maximum heating rate (HRMAX) was observed.

3. The method as recited in claim 2 wherein the step of determining the heat lag (L) of the furnace comprises the substep of:
   (h) determining the heat lag (L) in accordance with the following expression:

$$L = [(HRMAX*SGAMMA) - (t_m - t_s)]/HRMAX.$$

4. The method as recited in claim 2 wherein the step of determining the maximum heating rate (HRMAX) comprises the substeps of:
   (i) initially setting the maximum heating rate (HRMAX) to zero and initializing an index value (IND) to a predetermined number;
   (j) determining the current heating rate (HRCUR) and performing step k;
   (k) comparing the current heating rate (HRCUR) with the maximum heating rate (HRMAX) to determine whether the current heating rate is greater than the maximum and, if not, performing step 1 and, if so, setting the maximum heating rate (HRMAX) equal to the current heating rate (HRCUR) and repeating step i; and
   (l) decrementing the index variable (IND) by one and determining whether it is less than or equal to zero and, if not, repeating step j and, if so, the value of (HRMAX) is determined to be the maximum heating rate.

5. The method as recited in claim 3 wherein the temperature of the furnace is to be increased to and maintained at a desired temperature ($t_d$), and wherein the step of modulating the temperature of the furnace further comprises the substeps of:
   (m) determining the initial heating rate (HRINT) of the furnace prior to applying the predetermined quantum of energy;
   (n) determining the temperature deviation (DEV) between the current temperature ($t_c$) and the desired temperature ($t_d$);
   (o) computing proportional, integral and derivative control constants, PC, IC and DC, respectively, as follows:

$$PC = (a*PWR)/[(HRMAX - HRINT)*L]$$

$$IC = (b_1/(L*b_2)),$$

and $$DC = b_1*b_2*L$$

wherein PWR represents the quantum of power which was supplied to the furnace when HRMAX was observed and a, $b_1$ and $b_2$ are chosen in accordance with the following expressions:

$$1.0 \leq a \leq 2.0$$

$$0.5 \leq b_1 \leq 1.0,$$

and $$40 \leq b_2 \leq 80.$$

6. Apparatus for controllably heating a furnace comprising:
   sensor means for providing a temperature signal indicative of the furnace temperature;
   heat source means responsive to a heat control signal for heating said furnace; and
   data processing means for providing the heat control signal, said data processing means being responsive to the temperature signal to determine the heating constants of the furnace from the heating characteristics of the furnace, the heating characteristics including at least the heat lag of the furnace defined as the difference between the time required for the furnace to reach the temperature at which a maximum heating rate is observed and the time necessary for a linearly heated furnace, having a heating rate equal to the observed maximum heating rate, to reach this same temperature, said data processing means being adapted to modulate the heat control signal in response to the determined heating constants to thereby control the temperature of the furnace.

7. Apparatus as recited in claim 6 wherein said heat source means comprises a power source, a first switch and a heating element, said apparatus further comprising:
   a second switch coupled to said power source and responsive to an override signal for transferring power received from said power source to said first switch, said first switch being responsive to the heat control signal for transferring power received from said second switch to said heating element; and
   power checker means for determining when said heating element is receiving power from said power source, said data processing means being responsive to said power checking means for determining whether said first switch has malfunctioned and, if so, interrupting the override signal to prevent said second switch from providing power from said power source to said first switch.

8. Apparatus as recited in claim 7 further comprising:
   means for providing a timed interrupt, said data processing means being responsive to the timed interrupt for providing the override signal.

9. A method for increasing the temperature of a furnace to a predetermined desired temperature without overshooting the desired temperature, said method comprising the steps of:
   (a) determining the heat lag of the furnace as a function of the system's response to a predetermined quantum of power input by using the input power to heat the furnace and determining the heat lag of the furnace defined as the difference between the time necessary for the furnace to reach the temperature at which the maximum heating rate is observed and the time necessary for a linearly heated furnace, having a heating rate equal to the observed maximum rate to reach this same temperature;
   (b) supplying a first predetermined quantum of power for heating the furnace until the determination is made, based on the determined heat lag, that power must be reduced in order to effectively reduce the rate of temperature increase of the furnace such that the furnace does not overshoot the desired temperature; and
   (c) using the determined heat lag to control the temperature increase of the furnace such that the furnace temperature increases to the desired temperature in an exponential manner.

10. The method as recited in claim 9 wherein the step of determining the heat lag of the furnace comprises the substeps of:
    (d) determining the temperature of the furnace and, thereafter, applying a second predetermined quantum of power to the furnace;
    (e) determining the maximum heating rate (HRMAX) of the furnace while being supplied with the second predetermined quantum of power and, thereafter, rrecording the time (SGAMMA) elapsed since the first predetermined quantum power has been applied and recording the temperature of the furnace at which the maximum heating rate (HRMAX) was observed; and
    (f) determining the heat lag (L) of the furnace as follows:

$$L = [(HRMAX*SGAMMA) - (t_m - t_s)]/HRMAX.$$

11. The method as recited in claim 10 wherein the step of applying full power to the furnace until the determination is made that the power must be reduced comprises the substep of determining whether the following expression is true:

$$t_c \geq t_d - L*HRMAX*RH4$$

and, if so, reducing the quantum of power supplied to the furnace.

12. The method as recited in claim 9 wherein the step of using the determined heat lag to control the temperature increase of the furnace comprises the substeps:
    (g) determining a set point temperature based on a polynomial curve fit as the temperature at which the furnace should be during a future predetermined time period;
    (h) determining the temperature deviation between the set point temperature and the current temperature;
    (i) modulating the quantum of power supplied to the furnace in response to the temperature deviation and the furnace tuning constants such that the temperature of the furnace is driven toward the set point temperature; and
    (j) repeating steps g-i until the current temperature is within a predetermined range of the desired temperature.

13. Apparatus for preventing the transfer of power from a furnace power source to a furnace heat source upon the malfunction of the furnace control system, said apparatus comprising:
    first switch means coupled to receive power from said power source;
    second switch means coupled to receive power from said first switch means and responsive to a heat control signal for transferring power received from said first switch means to said heat source;
    power checker means for indicating when power is being received by said heat source; and
    data processing means responsive to a timed interrupt for providing the override signal and the heat control signal, said data processing means being responsive to said power checker means for determining when a control system malfunction has occurred and, upon making such determination, for interrupting the override signal, said first switch means being responsive to the override signal for transfering power received from said power source to said second switch means such that, upon interruption of the override signal, power is no longer applied to said second switch means.

14. Apparatus as recited in claim 13 wherein said first switch means further comprises:
    watchdog switch means for receiving the override signal and providing in response thereto a power connect signal; and third switch means responsive to the power connect signal for transferring power received from said power source to said second switch means.

15. Apparatus as recited in claim 14 wherein said second switch means is further responsive to the power connect signal for transferring power received from said third switch means to said heat source.

* * * * *